Feb. 17, 1970 M. R. RICHMOND ET AL 3,496,544

SIGNAL CORRELATION APPARATUS

Filed Sept. 9, 1965 6 Sheets-Sheet 1

INVENTORS
MARTIN R. RICHMOND
DANIEL BLITZ
THEODORE MAIRSON
MURRAY KAYE

BY
Willard R. Matthews Jr.

ATTORNEY

INVENTORS
MARTIN R. RICHMOND
DANIEL BLITZ
THEODORE MAIRSON
MURRAY KAYE

BY Willard R. Matthews
ATTORNEY

INVENTORS
MARTIN R. RICHMOND
DANIEL BLITZ
THEODORE MAIRSON
MURRAY KAYE

BY Willard R. Matthews, Jr.
ATTORNEY

SIGNAL CORRELATION APPARATUS

Filed Sept. 9, 1965 6 Sheets-Sheet 4

INVENTORS
MARTIN R. RICHMOND
DANIEL BLITZ
THEODORE MAIRSON
MURRAY KAYE
BY Willard R. Matthews, Jr.
ATTORNEY

INVENTORS
MARTIN R. RICHMOND
DANIEL BLITZ
THEODORE MAIRSON
MURRAY KAYE

BY
Willard R. Matthews, Jr.
ATTORNEY

INVENTORS
MARTIN R. RICHMOND
DANIEL BLITZ
THEODORE MAIRSON
MURRAY KAYE
BY
Willard R. Matthews, Jr.
ATTORNEY United States Patent Office 3,496,544

Patented Feb. 17, 1970

3,496,544

SIGNAL CORRELATION APPARATUS

Martin R. Richmond, Belmont, Daniel Blitz, Boston, and Theodore Mairson and Murray Kaye, Lexington, Mass., assignors to Sanders Associates, Inc., Nashua, N.H., a corporation of Delaware Filed Sept. 9, 1965, Ser. No. 486,140

Int. Cl. G06f *15/34;* G06g *7/19*

U.S. Cl. 340—149 24 Claims

ABSTRACT OF THE DISCLOSURE

Apparatus is disclosed for identifying signals comprising an orthogonal magnetic core storage matrix for storing time polarity characteristics of a signal and a signal correlation network having a plurality of summing arrangements each responsive to characteristics of a particular signal.

This invention relates to signal identification and especially to applications which require the detection of particular signals from a multiplicity of simultaneously appearing signals. Significant features of the invention include a novel orthogonal magnetic core storage matrix, suitable to simultaneously store a multiplicity of signals, a novel signal correlation network having various summing arrangements responsive to time phase and amplitude characteristics of particular signals, and the feature which comprises the novel manner of delivery of signals stored in said storage matrix to said correlation network.

It will subsequently become apparent that there are many varied applications of the subject invention. Those skilled in the art will at once recognize the apparent utility of the invention in data processing systems, speech recognition devices, number-testing apparatus, radar systems and the like. Doppler radar systems in particular may be greatly improved by the use of the invention. For example, a possible pulse Doppler radar system requires that 1,000 signals, representing the output of 1,000 range gates be simultaneously examined for the presence of Doppler signals which indicate target speeds. In such a system, some 40 Doppler filters having 0.5-kilocycle bandwidths are utilized to cover a frequency range from 0 to 20 kilocycles. Each of the 1,000 signals would therefore have to be processed by 40 Doppler filters. Thus for a radar system having 1,000 range gates and 0.5-kilocycle resolution in a 20-kilocycle frequency range, 40,000 filters would be required to process all possible range and Doppler signals. Additionally, each filter output would require its own detection circiut. Systems of this type which require large numbers of components are prohibitively bulky and expensive. Accordingly, the size and cost economies in radar systems provided by the present invention constitute an appreciable step forward in the art.

As indicated above, the present invention comprehends simultaneous storage of a multiplicity of signals, subsequent readout of each stored signal, and delivery of the read out signals to a novel correlating network. The prior art approach to such a storage problem has been to write data representing a multiplicity of signals into storage tubes by columns and to subsequently read out such data by rows. Such storage tubes are fragile, expensive, unreliable and bulky. Furthermore, they are limited in data return and in the quality of data stored. Such limitations are overcome by the particular magnetic core matrix and mode of operation thereof of the present invention.

Another problem prevalent in prior art signal identification systems is that of correlating the stored information with identifiable signals. This type of cross-correlation in the past has been accomplished by the use of generalpurpose computers. Such a solution requires the use of large, expensive equipment that is inefficient and generally inadequate for the purposes herein comprehended.

Accordingly, it is a principal object of the present invention to provide new and improved apparatus for signal identification.

It is another object of this invention to provide new and improved apparatus for signal identification that is not amplitude sensitive.

It is another object of this invention to provide novel storage means wherein a multiplicity of signals can be simultaneously stored and wherefrom said signals can be sequentially read out.

It is another object object of this invention to provide novel signal correlation networks suitable to identify particular signals stored in said storage matrix.

It is another object of this invention to provide signal identification apparatus that is inexpensive and has a minimum number of components.

It is another object of this invention to provide a magnetic core orthogonal storage matrix adapted to store simultaneously the time polarity characteristics of any number of signals, and wherefrom the stored time polarity characteristics for each signal can be sequentially read out at microsecond intervals.

It is another object of this invention to provide signal correlating means including a plurality of summing networks, each arranged to correspond to the time phase and amplitude characteristics of a particular signal.

It is another object of this invention to provide signal identification apparatus consisting of the combination of said magnetic core orthogonal storage matrix and signal correlating network.

These, together with other features and objects of the invention will be more readily understood from the following detailed description taken in conjunction with the accompanying drawings, in which like elements are given like reference numerals throughout, and wherein.

Figure 1:
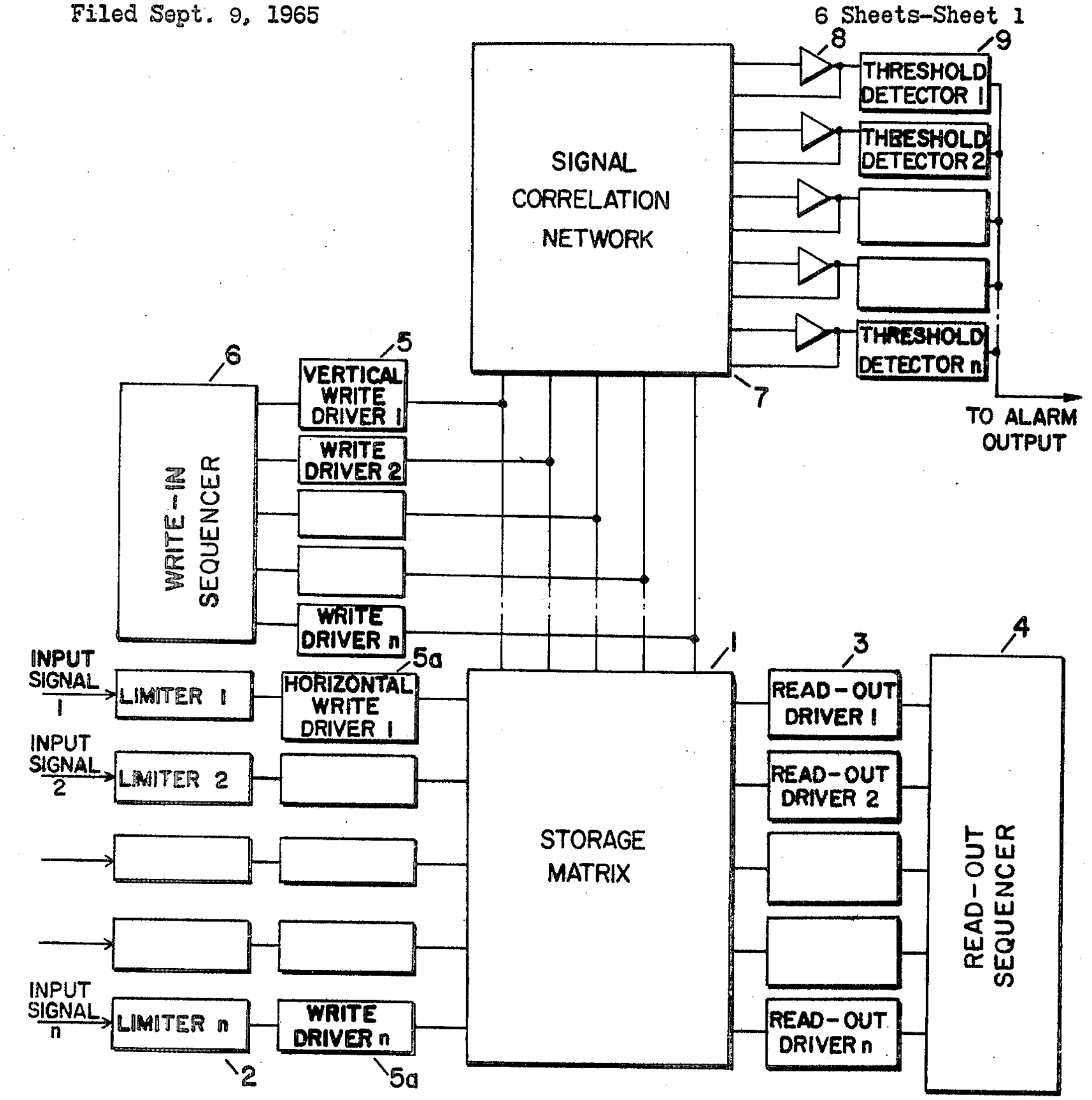
FIG. 1 is a block diagram of one presently preferred embodiment of the invention.

Identification of an unknown signal or the detection of the presence of a particular signal in a multiplicity of signals can be accomplished by comparing all such signals with certain standards. Correlation of a compared signal with a standard initiates an output indicative of the presence of that particular signal. Such signal correlation is achieved in accordance with the principles of the present invention by storing the signal to be examined and then simultaneouly sampling the stored information at various points representing different moments in its history.

The sampled points are summed in such a pattern as to duplicate the phase history and amplitude of a desired signal. A signal matching this pattern will have all its summed points adding to produce a peak output whereas all other signals will sum with a mixed phase and amplitude relationship resulting in a low output. It is of course within the scope of the invention to connect the summing points such that a matching signal will be identified by a null or zero output. Various summing patterns can be used simultaneously to supply separate outputs, each responding to a particular signal. More particularly, the signal to be correlated is fed into a tapped delay or storage system. Such a system may be mechanical, acoustical, optical, electro-magnetic, electro-mechanical, magneto-mechanical, chemical or digital. In applications where the range of signal frequencies is relatively low, magneto-mechanical and digital delay systems are considered to be most suitable. The magneto-mechanical system may be a magnetic recorder-reproducer using either tape, wire or drum, with multiple readout heads spaced apart so that various parts of the recorded signal would be available as a simultaneous ensemble of signals. The digital delay system can comprise a binary shift register with a readout wire connected to each bit. The time scale can be varied with either system, by varying the recorder-reproducer speed in the magneto-mechanical system or by varying the clock rate in the digital shift register system. At a given time the set of readout wires for the magnetic tape contains a sampled representation of the signal. Therefore, by summing those samples which will be in phase at a particular time during the signal's journey through the delay device, a peak sum will be obtained. Alternately, a matrix comprising connections corresponding to all of the expected phase histories may be used, the combination of connections holding the largest sum output indicating that a correlating signal is present.

It is sometimes desirable, as in the case of a radar system having many range gate outputs, to process large numbers of signals in very short time intervals. Another feature of the invention comprehends an orthogonal memory matrix wherein many signal channels can be simultaneously stored. Information from each channel is stored in a different row of the matrix, with each column of the matrix representing samples at a specific point in time. When the matrix is filled, it is read out a row at a time at right angles to the input. For each readout time, the outputs from the columns simultaneously contain the various time samples of a single input channel. Accordingly, any type of memory device which stores signals sequentially and reads them out simultaneously at predetermined time intervals, such as a memory device capable of serial read-in and parallel read-out is comprehended by the invention. It is yet another feature of this invention to combine such an orthogonal memory matrix with the signal matching correlating networks to provide signal identification apparatus capable of rapidly processing a multiplicity of signals.

In summary, therefore, the invention comprehends storage means for storing the time polarity information contained in a multiplicity of concurrently appearing signals and means for delivering such information to a novel arrangement of signal correlating networks wherefrom the presence of particular signals can be detected. The invention will hereinafter be described in detail with reference to one presently preferred embodiment thereof. It is to be understood that such embodiment represents but one of many such embodiments and is directed toward but one of many possible applications. Some of these embodiments and applications have been referred to above. Also, although particular components are to be described, it will be recognized that other similar or different components suitable to accomplish the purposes required will be equally effective in practicing the invention. By way of example, a tape recorder having multiple readout heads could be substituted for the magnetic core storage matrix of the particular embodiment to be described, as could a matrix of flip-flop circuits or any other suitable device. Accordingly, it is stipulated at the outset that the hereinafter described device is intended to be but illustrative of the principles of the invention and is not to be taken in a limiting sense.

Referring now to FIG. 1, there is illustrated thereby a block diagram of such presently preferred embodiment of the invention. Storage matrix 1 comprises a multiplicity of magnetic cores arranged in rows and columns. Input signals *l* through *n* are limited by limiters 2, and each such limited signal is applied to one of the horizontal write drivers. Limiters 2 may comprise means suitable for providing a substantially square wave signal input. The signal from each horizontal write driver is applied to one of the horizontal rows of the storage matrix. Horizontal write drivers 5*a* are provided to insure appropriae signal strength when coupled with the output of vertical write drivers 5 to activate the magnetic storage cores and may be any suitable conventional amplifier means. Input signals *l* through *n* are thus made to appear on their respective horizontal rows of magnetic cores of the storage matrix. The vertical columns of magnetic cores of the storage matrix are pulsed in sequence by write sequencer 6. The output pulses of write sequencer 6 as amplified by vertical write drivers 5 are effective to activate those magnetic cores of the storage matrix where there is a coincidence with positive pulses of the input signals. The time polarity characteristics of each input signal are thus recorded on the horizontal magnetic core rows of the storage matrix. Each such horizontal magnetic core row then may be read out in sequence by means of sequential pulses provided by readout sequencer 4 as amplified by readout drivers 3. As each horizontal row is read out, pulses responsive to the signal time polarity characteristics therein stored will appear on the vertical drive wires and will be delivered to a multiplicity of parallel signal correlation networks. Each individual network of signal correlation networks 7 is arranged to sum separately outputs representing the positive and negative portions of a particular signal. The negative portion of the signal is subsequently passed through an inverter 8 and summed with the output of the positive portion of the signal. The total sum may then be applied to a threshold detector 9. In the event of substantial correlation between the time phase characteristics of a signal as read out of the storage matrix and a particular correlation network, a signal detectable by the threshold detector will appear at the output of the system and may be visually displayed or used to activate an alarm or the like.

Figure 2:
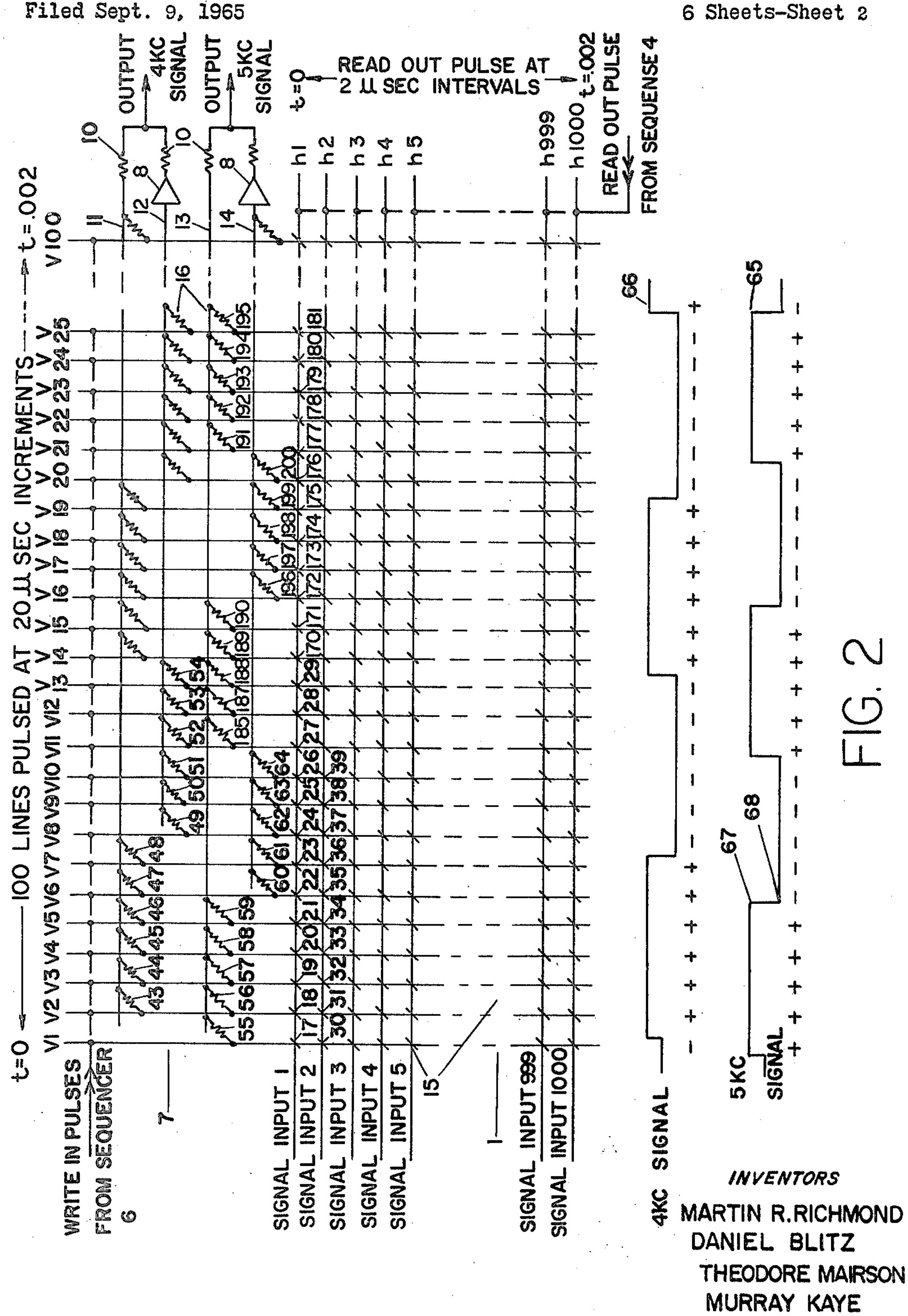
FIG. 2 is a schematic representation of the storage matrix of FIG. 1 in combination with signal correlation networks for four- and five-kilocycle signals.

A more complete understanding of the signal analyzing apparatus of FIG. 1 may be achieved by consideration of the following detailed description of its operation with reference to two particular signals. Reference is now made to FIG. 2, which illustrates schematically portions of storage matrix 1 and signal correlation networks 7, together with two typical signal waveforms. The storage matrix illustrated in FIG. 2 comprises 1,000 rows of magnetic cores which are arranged in 100 vertical columns. Horizontal drive wires *h*1 through *h*1000 connect each core in their respective rows. Vertical drive wires V1 through V100 connect each core in their respective columns. The magnetic cores are illustrated schematically by short diagonal lines and are identified generally by reference numeral 15. In the ensuing description, particular cores will be given particular reference numerals. As many as one thousand signals can be simultaneously stored on such a matrix. By way of illustration, the processing of two particular signals, 5-kilocycle signal 65 and 4,167-kilocycle signal 66, will now be described. For the purposes of this example, it will be assumed that signal 65 appears on horizontal drive line *h*2 and signal 66 appears on horizontal drive line *h*1. Signals 65 and 66 are also assumed to begin their positive half cycles at the instant the first write pulse is applied to vertical drive wire V1. Signals of other phases will be described hereinafter with reference to FIG. 3. Referring again to FIG. 2 it will be noted that waveforms representing the 4.167-kilocycle and 5-kilocycle signals have been drawn in particular relationship to the storage matrix. Waveforms 65 and 66 as illustrated represent the time polarity characteristics of their respective signals, as they appear in phase on horizontal drive lines $h2$ and $h1$. Operating procedures for the instant example of the invention require that the vertical drive wires be pulsed in sequence at 20-microsecond increments. The total time, therefore, to pulse the 100 vertical drive wires is 2 milliseconds. Since a 5-kilocycle signal will alternate polarity every 100 microseconds, signal waveforme 65 has been illustrated alternating after every fifth vertical wire shown in FIG. 2. Likewise, 4.167-kilocycle signal 66 is illustrated as alternating after every sixth vertical drive wire. It is further to be noted with respect to signal waveforms 65 and 66 that such waveforms have been clipped, or limited, thus providing substantially square waves.

In operation, the magnetic cores are initially energized in one direction, say a counter-clockwise direction, and considered to be in a 0 state. The design parameters of the apparatus are such that in order to energize any magnetic core into an opposite, clockwise direction (a 1 state), it will require the coincidence of a positive signal pulse and a write pulse. That is, to change any magnetic core in the matrix from the 0 state to a 1 state, approximately half of the energy required is supplied from the signal on the horizontal drive wire and half from the write pulse, either signal by itself being insufficient to change the state of a core. Since these signals must be coincident, each core is effectively an AND gate. Assuming now that all cores in the storage matrix are in a 0 state and signals 65 and 66 are appearing on horizontal drive lines $h2$ and $h1$ respectively, sequential pulsing of the vertical drive wires at 20-microsecond increments will register the time polarity characteristics of said signals in the storage matrix. This is accomplished as follows: During the first 100 microseconds and consequently the first five pulses, horizontal drive wire $h2$ is positive and coincidence between this positive condition of the drive wire and the write pulses is effective to energize magnetic cores 30 through 34 and place them in a 1 state. During the next 100 microseconds, horizontal drive wire $h2$ is in a negative condition and, there being no coincidence of positive pulses and write pulses, the magnetic cores 35 through 39 are not energized and remain in a 0 state. The remaining magnetic cores on drive wire $h2$ will be energized or not energized in the same manner while the write pulses sequence through vertical drive wire V100. Simultaneously the signal 66 is being written into the storage matrix on horizontal drive wire $h1$. In this instance, however, because of the lower frequency of the signal, the horizontal drive wire is in a positive condition for a longer period of time and consequently six magnetic cores (cores 18 through 23) are energized and placed in a 1 state; and the next six magnetic cores 24 through 29, remain in a 0 state. The time polarity characteristics of the two signals have thus been stored in the storage matrix. In accordance with the principles of the invention, various summing networks are connected to the vertical drive wires. In the example of FIG. 2, two such summing networks are illustrated, one being responsive to a 5-kilocycle signal and the other to a 4.167-kilocycle signal. These summing networks comprise connections through weighted resistors to certain selected drive wires in combinations designed to establish coincidence with the time phase characteristics of given signals. For instance, wires 13 and 14, together with appropriate resistors, comprise a summing network adapted to detect a 5-kilocycle signal; and wires 11 and 12 and the resistors associated therewith comprise a summing network adapted to detect a 4.167-kilocycle signal.

However, it should be noted that either of the arrangements shown can be made equivalent to any other arrangement of like numbers of positive and negative samples, merely by changing the sequence in which the vertical wires are pulsed during the write cycle to conform to the new arrangement.

In operation, the horizontal drive wires $h1$ through $h1000$ are pulsed successively by readout pulses from a readout sequencer. When a substantially large readout pulse is applied to a horizontal drive wire. The magnetic cores in the particular row which have previously been energized and placed in a 1 state are de-energized and placed back in a 0 state. This is a destructive readout, which causes pulses to appear on appropriate vertical drive wires. These pulses are then summed by the summing network. Magnetic cores that had been in a 0 state are unaffected by the readout pulse and no signal appears on those vertical wires. In the event that the time phase characteristics of the signal derived from the horizontal drive wires coincides with a particular summing network, a maximum signal output will be obtained. This will be the case when horizontal drive wire $h2$ of FIG. 2 containing the time phase characteristics of 5-kilocycle signal 65 is pulsed with a readout pulse. That is, positive pulses from cores 30 through 34 will be added by resistors 55 through 59 of the summing network. There will be no pulses from cores 35 through 39 as they have been in a 0 state resulting from the magnetic phase of the signal. The remaining groups of summing resistors will sum the output of the remaining magnetic cores of horizontal drive wire $h2$ in the same manner.

Referring to the waveform 65 of the 5-kilocycle signal, it will be noted that the plus and minus notations appearing below the waveform coincide with vertical drive wires. These plus and minus notations indicate the polarity of the signal on horizontal drive wire $h2$ at the particular instant in time of the written-in signal, and hence the condition of the respective magnetic cores residing on the wire. That is, cores on drive wire $h2$ which correspond to plus notations have been put in a 1 state, and cores corresponding to minus notations remain in a 0 state. As positive readout wire 13 of the 5-kilocycle signal summing network is connected through summing resistors to the vertical wires passing through the cores which are in the 1 state, it will sum 15 pulses when horizontal drive wire $h2$ is read out. Negative readout wire 14 will of course sum no pulses when horizontal drive wire $h2$ is read out, since all connections thereto are made to vertical drive wires which connect to magnetic cores residing in a 0 state at the time of pulsing. There will therefore be no inverted pulses to subtract from the 15 pulses summed by positive readout wire 13. This of course may be extrapolated over the entire 100 vertical drive wires to provide a total for this particular correlation network of 50 pulses, or a maximum output, as would be expected from an exactly coinciding signal. An examination of waveform 66 of the 4.167-kilocycle signal and its time polarity relationship with the summing network comprising lines 11 and 12 and the associated restrictors will reveal that a similar maximum signal output will be obtained. The first positive half cycle of signal 66 will provide six successive pulses which will be detected and summed by resistors 43 through 48, and each succeeding positive half cycle of the signal will provide six pulses which will be summed by appropriate combinations of resistors. It is thus apparent that the coincidence of a signal of a particular frequency with a correlation network of such particular frequency will produce a maximum output signal.

Signals which do not coincide with the correlation networks will present to the outputs from the various groups of summing resistors pulses of mixed polarity which, over the 100 vertical drive wires span of the device, will substantially cancel each other out to provide a very low signal output. This is illustrated by comparing the 4.167-kilocycle signal of FIG. 2 with the 5-kilocycle signal correlation network. In this instance, magnetic cores 18 through 23 and 170 through 175 are energized or put into a 1 state when the 4.167-kilocycle signal is written into horizontal drive wire $h1$. When horizontal drive wire $h1$ is read out, pulses appear on vertical wires V2 through V7 and V114 through V119. Resistors 56, 57, 58, 59, 189 and 190 sum the pulses appearing on vertical wires V2, V3, V4, V5, V14 and V15, and resistors 60, 61, 196, 197, 198 and 199 sum the pulses appearing on V6, V7, V16, V17, V18 and V19. The six pulses added by resistors 60, 61, 196, 197, 198 and 199 are inverted by inverter 8 and added to the six pulses which were added by resistors 56, 57, 58, 59, 189 and 190, with the net result being a zero output. This type of cancelling out of pulses will occur throughout the entire span of the 100 vertical drive wires. Although signals which do not coincide with a particular correlation network may produce some measurable output, the cancellation effects above described insure that such an output will be well below the threshold level of system threshold detectors.

The correlation network hereinabove described is arranged to sum only the positive portions of the signal. In the event that the resistors are arranged such that there is no loading of any resistor by the rest of the network, a signal which is asymmetric, that is, one which has unequal positive and negative portions would produce large or small outputs respectively, according to whether or not the positive portion is a large or small fraction of the total signal duration. In an extreme case, a signal which is all negative would produce no output, while a signal which is all positive would produce an output comprising 100 pulses. On the other hand, in the case of a signal which is symmetric, that is, one in which the positive and negative portions of the signal are of equal total duration, no significant effect would be experienced by not summing the negative portion of the signal. The loss in gain by a factor of two is not considered significant since it is easily compensated for, if need be, by subsequent amplification. The above situation can be overcome by summing negative, as well as positive parts of the signal. Of course a more complicated storage and read-out system would be required. For example, a core in the 0 state would be required to produce a negative output pulse during the read-out cycle instead of a zero output.

It is not necessary to complicate the system to such a degree, however. A simpler, and equally effective, method comprehended by the invention is simply to add a bias to the combined output by an amount equal to half the difference between the number of connections made to the inverted (negative) and direct (positive) output busses (readout wires).

$$\text{Bias} = V\,\frac{\text{Negative Bus Taps} - \text{Positive Bus Taps}}{2}$$

where V is the output voltage resulting from a 1 on a single core. When there are an equal number of positive and negative taps, the required bias reduces to zero.

For example, assume a system with 100 samples, each producing an output of one volt for a 1 and zero volt for 0. A network matching a square wave would have 50 taps to the positive bus and 50 to the negative. The required bias would be zero. A correlated signal would produce +50 volts on the positive bus and nothing on the negative, and the combined output would be +50 volts. An inverted (or out-of-phase signal) would produce nothing on the positive bus and +50 volts on the negative. After inversion of the negative bus, the combined output would be −50 volts. A random noise input would generate, on the average, +25 volts on both the positive and negative busses. After inversion of the negative bus, its −25 volt output would cancel the positive bus output, leaving a combined output of zero.

Now, assume a network matching an asymmetrical signal with 10 positive and 90 negative taps. The required bias to be added to the combined output would be found from the equation shown above to be $$1\ \text{volt} \times \frac{90-10}{2} = +40\ \text{volts}$$

With a correlated input signal there would be +10 volts on the positive bus and nothing on the negative bus. When added to the +40 volt bias signal, the output would be +50 volts, which is the same amplitude as in the case of the symmetrical square wave signal shown above. With an inverted input signal, there would be nothing on the positive bus, and +90 volts on the negative bus. After inversion, this would be −90 volts, and when added to the +40 volt bias signal, the output would be −50 volts, the same as in the inverted symmetrical square wave case. With a random noise input, the positive bus would have an average voltage of +5 volts, and the negative bus an average of +45 volts. After inversion of the negative bus, its −45 volt signal would combine with the positive bus signal to give −40 volts. When added to the +40 volt bias, the total output would be zero.

The above assumes there is no loading of any resistor by the rest of the network. Where such loading takes place, the bias is as follows:

$$\text{Bias} = \frac{V_n \times \text{negative taps} - V_p \times \text{positive taps}}{2}$$

where $V_n$ is the resultant output voltage on the negative bus when only one of the cores connected to it contains a 1, and $V_p$ is the positive bus output for a 1 from one of the cores connected to it.

Where the resistors are all of the same value, the loading is such that, regardless of the signal symmetry, the positive output for an input signal matching the network is equal to the negative output produced by an inverted input signal, so that no bias is required.

For example, assume an unloaded core output of 1 volt. For a square wave network with 50 positive and 50 negative samples, the loading of each resistor to the positive bus by the remaining 49 would reduce its output to $\frac{1}{50}$ volt; and similarly in the negative bus. Therefore, a correlated output would contain in the positive bus $$50 \times \frac{1}{50} = +1\ \text{volt}$$

and with zero output from the negative bus, the total output would be +1 volt. An inverted input would produce +1 volt in the negative bus only, and after inversion would produce a combined output of −1 volt. A random noise input would produce $25 \times \frac{1}{50} = +\frac{1}{2}$ volt on both positive and negative busses. After inversion of the negative bus, and totalling, the combined output would be zero.

Now assume a network matched to an unsymmetrical signal with 10 positive and 90 negative samples. If the unloaded core output is still 1 volt, the loading of each resistor on the positive bus by the other 9 reduces its output to 0.1 volt, whereas the loading of the negative bus reduces any single output to $\frac{1}{90}$ volt. For a matching input signal, the positive bus output will be 10×0.1 volt, or +1 volt, with zero contribution from the negative bus. When an inverted signal is received, the total output will be from the negative bus, with a value of $90 \times \frac{1}{90} = +1$ volt. As the negative bus is passed through an inverter, the resulting output is −1 volt. Further, if random noise is fed into the cores, the average output from the positive bus will be 5×0.1=+0.5 volt. The negative bus output will be $45 \times \frac{1}{90} = +0.5$ volt, which, after inversion, is −0.5 volt, leaving the combined output as zero volt.

Therefore, when the bus connecting resistors create proportional loading, the output amplitude for matching and inverted input signals, as well as noise, is independent of the symmetry of the signal, even without biassing.

Figure 3:
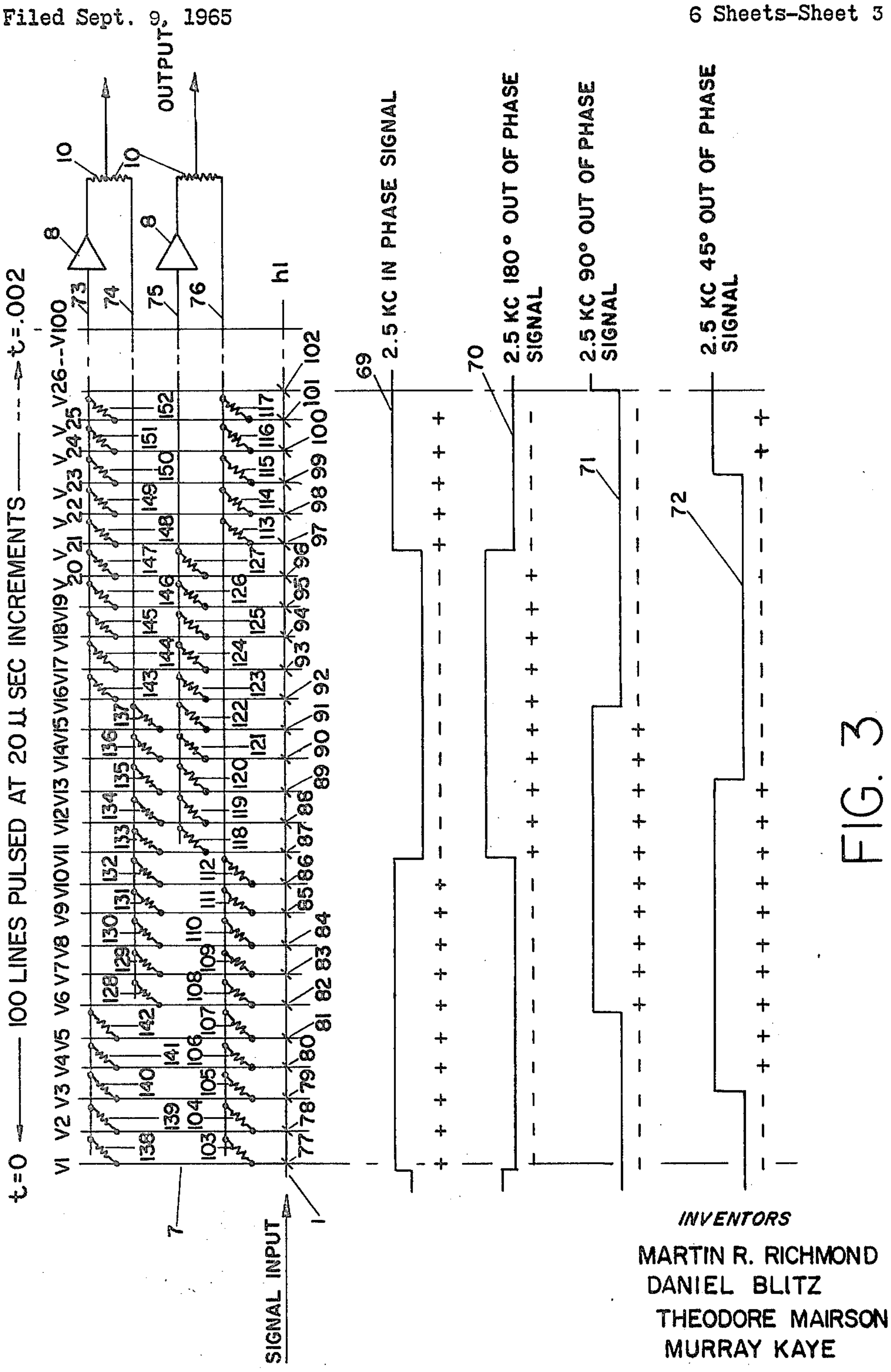
FIG. 3 illustrates schematically the summing networks suitable to accommodate in-phase and out-of-phase components of a 2500-cycle signal.

The above-described signal storage and correlation apparatus and the operation thereof have been based on the assumption that signals being written into the storage device are in a particular phase relationship with the write-in pulse sequencer. That is, at the moment the first vertical drive wire is pulsed, the signal appearing on horizontal drive wire *h*1 is just going positive or beginning its positive half cycle. This of course will not always be the case. It is therefore another feature of the invention to provide correlation networks suitable to detect the presence of particular signals regardless of their phase relationship with respect to the pulsing sequence of he vertical drive wires. An example of such correlation network is illustrated in FIG. 3. By way of example, the correlation network of FIG. 3 is designed to produce a detectable output when the time polarity characteristics of a 2.5-kilocycle signal are delivered thereto.

Waveform 69 illustrates such a 2.5-kilocycle signal that is in phase with the vertical drive wire pulsing sequencer. Over the 25 vertical drive wire portion of the storage matrix illustrated in FIG. 3, pulses stored in the matrix representing the in-phase 2.5-kilocycle signal will produce a maximum signal output when read out into the summing network comprising wires 75, 76 and associated resistors. That is, resistors 103 through 112 will sum 10 pulses, and resistors 113 through 117 will sum 5 pulses. A total of 15 pulses for this portion of the storage matrix will thus be summed. The next succeeding 25 vertical drive wire portion of the storage matrix will sum 10 pulses, and the total output of the entire storage matrix of 100 wires will therefore be 50 pulses.

In the event that the signal is 180 degrees out of phase, a similar summation will be obtained. An examination of waveform 70 reveals that sequential pulsing of the vertical drive wires will place magnetic cores 77 through 86 in a 0 state, magnetic cores 87 through 96 in a 1 state, and magnetic cores 97 through 102 in a 0 state. When the horizontal drive wire *h*1 is pulsed, or read out, pulses are summed on resistors 118 through 127 and are subsequently inverted. This provides a total summation of 10 negative pulses for the portion of the storage matrix illustrated in FIG. 3. In this instance the next succeeding 25 vertical drive wire portion will sum 15 negative pulses, and the total output of the entire storage matrix will be 50 negative pulses, as would be expected from the 180° out-of-phase signal.

The worst possible situation as far as the correlation network comprising wires 75 and 76 and resistors 103 through 127 is concerned is the 90° out-of-phase signal. Such a signal is illustrated by waveform 71. Comparing this waveform and its time polarity characteristics with the above-identified correlation network, resistors 108 through 112 will sum five positive pulses, and resistors 118 through 123 will sum five positive pulses. The five pulses summed by resistors 118 through 123 are made negative by inverter 8 and added to the five positive pulses summed by resistors 108 through 112. They, of course, cancel each other out. Over the course of the entire 100 vertical drive wires, the pulses for the 90° out-of-phase case will exactly cancel themselves out to provide a zero output. In order to compensate for this out-of-phase component which ordinarily would not be detected by the correlation network, a second correlation network comprising wires 73 and 74 and resistors 138 through 152 is provided as illustrated in FIG. 3. This arrangement of summing resistors is designed to coincide exactly with the 90° out-of-phase 2.5-kilocycle signal, and there will be 50 pulses in its output. The output will be identical, but negative, if the input is a 270° out-of-phase signal.

If such a 90° correlation network is utilized for each expected signal, then the worst possible situation would be a 45°, 135°, 225° or 315° out-of-phase signal. Such a 45° signal is illustrated by waveform 72, and its effect on the correlation networks will now be considered. Comparing the time polarity characteristics of waveform 72 with the correlation network comprising wires 75 and 76 and resistors 103 through 117, it may be seen that resistors 106 through 112, 116 and 117 will sum nine pulses. Resistors 118 through 120 will sum three pulses which are inverted by inverter 8 and added to the nine pulses already added to provide a net of six pulses. The total number of pulses added by the summing network therefore is six pulses in contrast to a possible fifteen positive pulses which would be obtained if the signal were in phase. However, the summation over the next succeeding 25 vertical drive wire portion of the storage matrix would have a higher count; and the total count over the entire storage matrix would amount to approximately 60% of the pulse count of an in-phase signal.

The output of such a correlation network for a 45° out-of-phase signal is in most instances adequate to be detected by the threshold detectors of the system. Comparable outputs for a 135°, 225°, or 315° signal will be produced by either the in-phase or 90° out-of-phase networks. Should a higher output for out-of-phase signals be required, it is only necessary to provide additional summing networks in different phase relationships. For instance, instead of the single additional 90° out-of-phase summing network illustrated in FIG. 3, two 60° out-of-phase summing networks could be used. Such an arrangement would provide out-of-phase signal responses that would be at worst 86% of the in-phase signal output.

The apparatus and concepts hereinabove described find particular utility as means for processing the output signals of pulsed Doppler radar range gates. Having reference again to FIG. 1 and to FIG. 4, operation of the apparatus of the invention as part of a radar system will now be described. By way of example, the radar system herein considered will be deemed to have 1,000 range gate outputs covering a frequency range from 0 to 20,000 cycles. Storage matrix 1 of FIG. 4, comprising a multiplicity of magnetic storage cores arranged in 100 columns of 1,000 rows, is capable of receiving simultaneously the Doppler signals from 1,000 separate range gate outputs. The signal correlation network 7 of FIG. 1 as shown in greater detail in FIG. 4 comprises 120 separate summing networks suitable to examine the signals in 40 Doppler bands. The Doppler bands are 500 cycles each to cover the range from 0 to 20,000 cycles. Three networks are provided for each Doppler band to coordinate signals at 60° phase increments.

In operation the output from each range gate is first limited and then connected to a horizontal drive wire of a magnetic core storage matrix. The vertical wires are then pulsed in sequence from left to right at intervals several times shorter than the period of the highest Doppler frequency of interest. In the present example such intervals are 20 microseconds each, and the time required to pulse the 100 columns of the storage matrix is therefore 2 milliseconds.

The apparatus described herein provides recognition circuits which have 500-cycle per second band widths. For example, the summing network associated with the 9.5–10 kc. Doppler band of FIG. 4 will respond to any signal within the 500-cycle range between 9.5 and 10 kc. It will not differentiate between signals within that range, such as between 9700-cycle and 9800-cycle signals. Greater signal resolution can be obtained by reducing the bandwidth of the Doppler bands. The number of Doppler bands required to cover a given frequency range would, of course, have to be commensurately increased. Once a desirable bandwidth for a given application has been selected, the total storage time (the time required to pulse all vertical columns of the matrix) can be determined. Since bandwidth is inversely proportional to storage time, the time required to pulse all vertical columns of the matrix in any given instance will be equal to a number of seconds represented by the reciprocal of the bandwidth. In the present example, in which the bandwidth is 500 cycles per second, the storage time is $\frac{1}{500}$ second, or 2 milliseconds.

The time intervals at which the vertical wires of the matrix are pulsed are determined by the highest frequency signal to be processed. It is preferred that each cycle of such highest frequency signal be sampled at least two and a half times. Thus, in the present example, the 20 kc. signal, which cycles once every 50 microseconds, is sampled at a 20-microsecond rate.

The total number of samples (and hence the total number of vertical drive wires of the matrix) required in any such system is therefore determined by dividing the storage time by the sampling time increment. That is, the number of vertical matrix drive wires is equal to the number of samples that can be taken at the sampling rate during the storage time. The system described herein, having a 2-millisecond storage time and a 20-microsecond sampling increment time, will of course require a matrix having 100 vertical drive wires.

Figure 4:
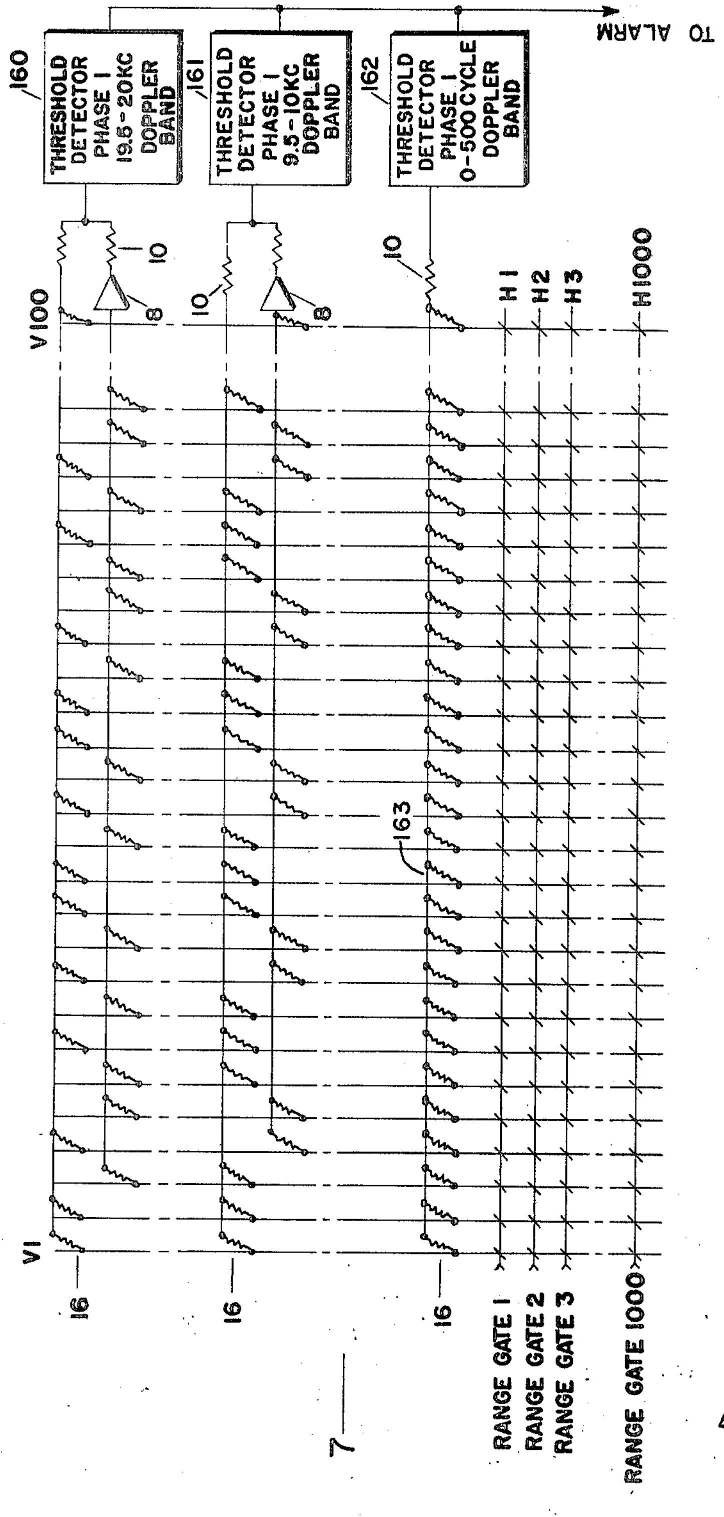
FIG. 4 illustrates schematically the cross-correlation network for a particular radar application.

In the particular example of FIG. 4, signals from the lowest Doppler band of zero to 500 cycles are correlated with a summing network arranged to exactly coincide with a 250-cycle signal. Since a 250-cycle signal cycles once every four milliseconds, the 2-millisecond pulse time for the vertical drive wires of the storage matrix provides time for one half-cycle only of the 250-cycle signal. If the signal begins its positive half cycle at the instant vertical drive wire V1 is pulsed, every core in the horizontal drive wire carrying the signal will be energized, and each such core will deliver a positive pulse when the horizontal drive wire is read out. Consequently, the summing network for the zero to 500-cycle Doppler band comprises resistors which sum every vertical drive wire. This summing network is illustrated by the summing network 163 of FIG. 4.

As the vertical wires are pulsed in sequence from left to right, the magnetic core at each wire intersection stores a binary signal representing the polarity of the signal in the range gate connected to its horizontal wire at the instant of arrival of the sampling impulse on its vertical wires. The total number of vertical wires to be pulsed is determined by the product of the Doppler integration time desired and the sampling frequency. Consequently, after all the vertical wires have been pulsed in sequence, the cores in any horizontal row will contain the time history of the polarity of the signal in one range gate during the desired integration time. Each horizontal row of cores carries a similar history of a separate range gate.

The information stored in the matrix is then read out, a range gate at a time. When a horizontal line is pulsed, the signal stored in each core along that line appears as an output on its vertical wires. Those vertical wires corresponding to the expected location of the positive half-cycles of an incoming Doppler frequency are summed to provide a combined output. The remaining vertical wires, corresponding to the location of the negative half-cycles, are combined in a second summation network, and its output inverted in polarity. The signals from the two networks are added together to provide a single output. A stored signal of the correct incoming frequency and phase would have outputs that were all of the same polarity on the vertical wires that were summed together, producing a large combined output signal. A stored signal of any other frequency would have summed outputs of mixed polarity which would cancel each other when combined.

Many summations can be performed simultaneously by different combinations of outputs. Some of these would be connected so as to allow for possible phase variations in the storage of the signal frequency. Others would sense the different Doppler bands of interest. Therefore, signals in any of the Doppler bands would appear as an output on the corresponding summing junction. Each output has a bandwidth inversely proportional to the total time of the signal that was stored in the magnetic core matrix.

The type of inputs that can be correlated by this technique is not restricted to simple continuous frequency signals, but can be designed to respond to swept frequency signals, shift frequencies, coded signals and the like.

Figure 5:
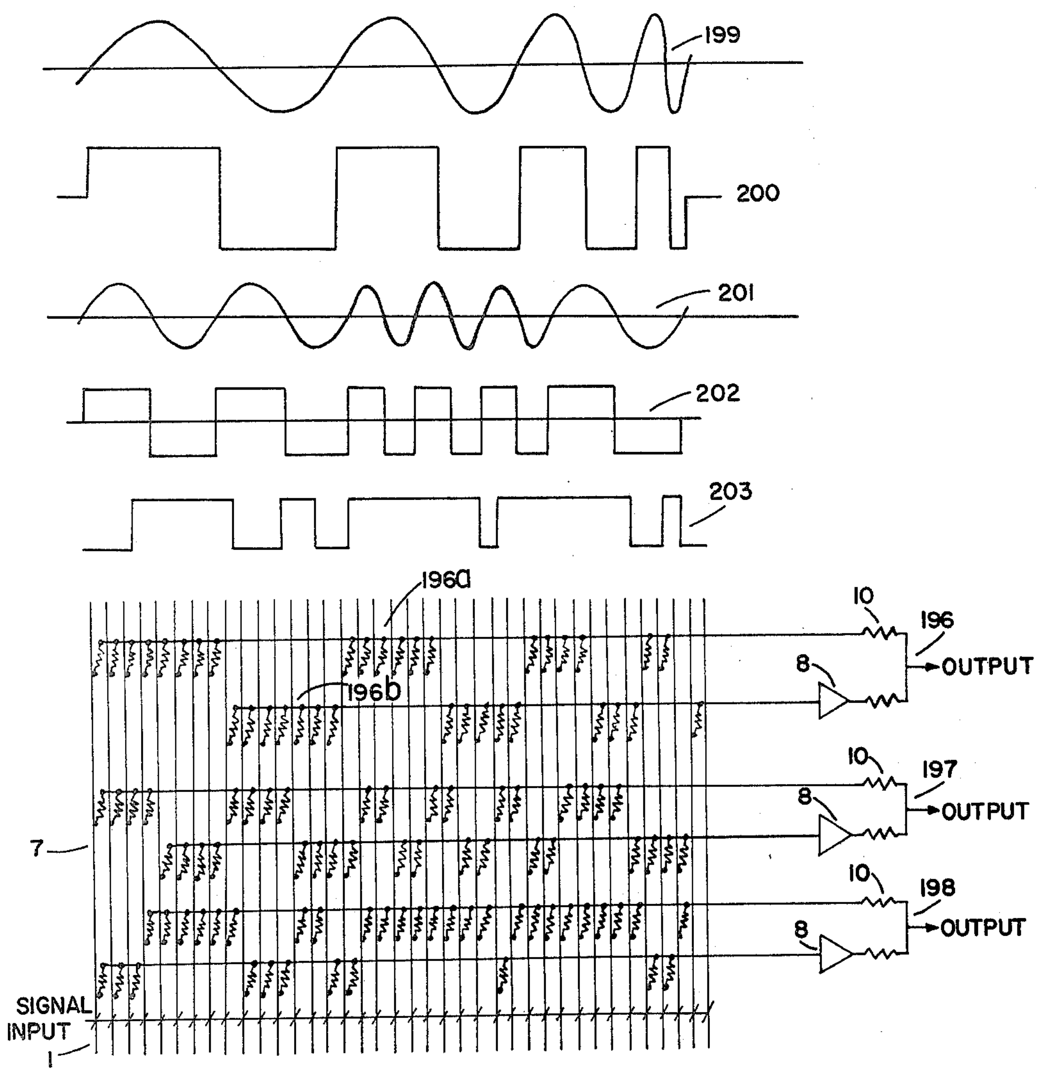
FIG. 5 illustrates correlation networks for various types of signals.

Examples of such signals and of summing networks suitable to detect them are illustrated by FIG. 5. Having particular reference to FIG. 5, it is noted that the waveforms therein appearing have been positioned to coincide with the summing network arrangements in order to more clearly illustrate the principles of the invention.

In practice, an incoming signal such as swept frequency signal 199 would be clipped and amplified to provide the substantially square wave signal 200; and the square wave thus provided would be applied to a horizontal signal input line of the storage matrix 1. The signal would then be read into and subsequently read out of the storage matrix in the manner described with reference to FIGS. 1, 2 and 3. Readout of the horizontal row of cores containing the swept frequency signal would produce pulses on the vertical wires of the matrix which correspond to the resistor summing circuit **196*a* of signal correlating network 196. There would be no pulses produced on the vertical wires of the matrix which correspond to the resistor summing circuit 196*b*. Therefore a maximum signal output would appear at the output of correlating network 196 when swept frequency signal 199** is processed.

Shift frequency signals are processed in the same manner. In the example of FIG. 5, shift frequency signal 201 is first limited to provide square wave signal 202. It is then amplified and stored in and later read out of the storage matrix. It is subsequently detected by correlating network 197.

Coded signal 203, being already in square wave form, can be applied directly to the storage matrix wherein it is stored and subsequently read out. The pulses resulting therefrom are added by correlation network 198 to provide a maximum output signal. It is apparent from these examples that virtually any type of signal can be detected by the apparatus contemplated by the present invention.

Despite the fact that the input signal is first amplitude limited and then stored in a binary core recording only signal polarity, the summed, filtered output can nevertheless be proportional in amplitude to that of the incoming, unfiltered signal if it is weaker than noise or other signals prior to limiting. This results from the fact that when, prior to the limiting action, the signal is buried in noise, it is only the amplitude of the noise that is being limited. The signal itself remains as a modulation of the average polarity of the limited noise, and the percentage modulation remains constant regardless of the amount of limiting.

Therefore, limiting reduces the gain of the weak signal by the same amount as it does the noise level, and the signal-to-noise ratio remains unmodified. Consequently, the correlated, filtered signal output is still linearly proportional to its unfiltered input prior to limiting. This effect holds true until the signal at the input becomes larger than the noise, but by then the signal output is well above noise; and limiting can be easily tolerated.

Figure 6:
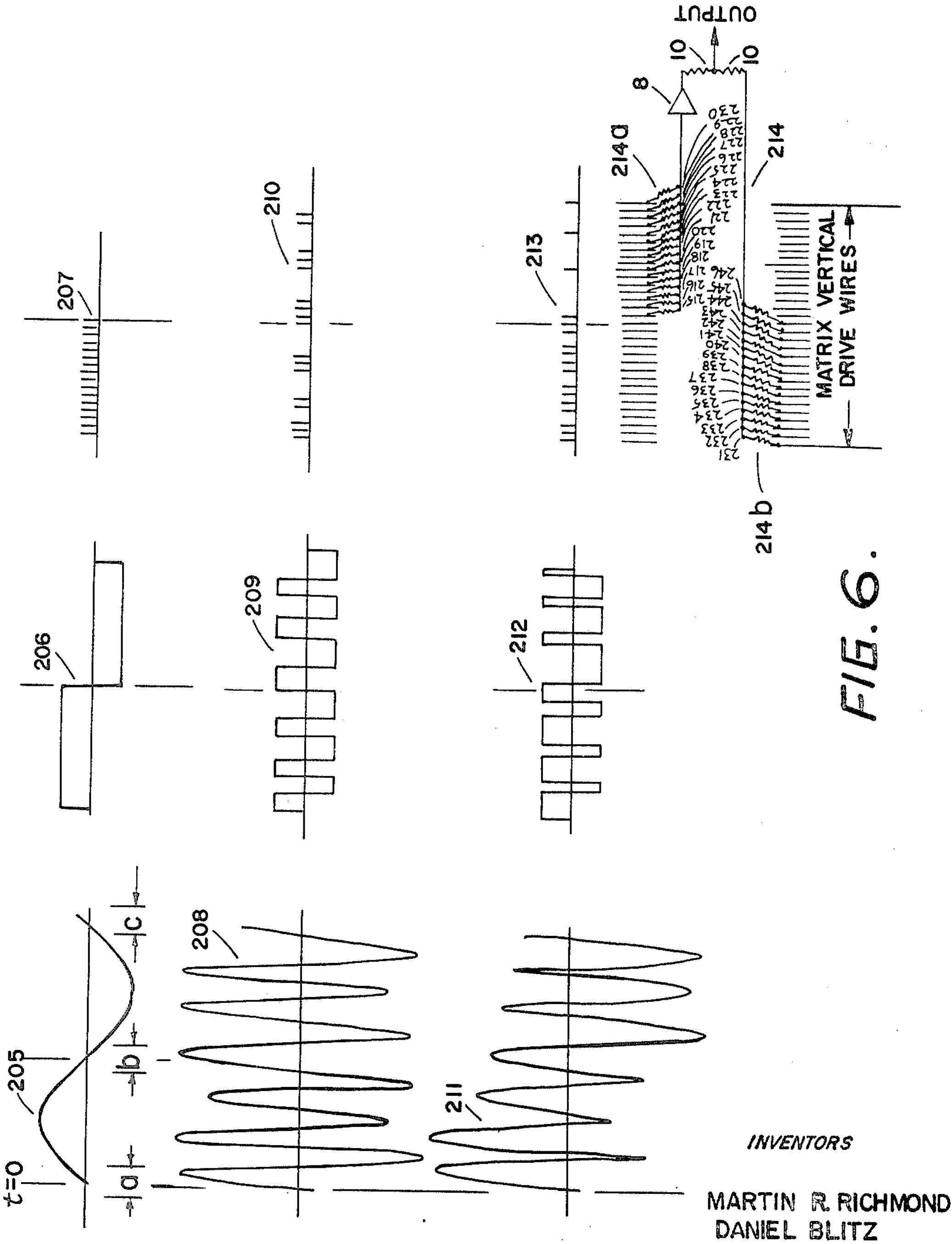
FIG. 6 illustrates the effects of noise upon signals processed by the apparatus of the present invention.

The foregoing will become more readily understood from the following description having reference to FIG. 6, wherein the ultimate effects of the time amplitude characteristics of an unprocessed signal upon the correlation network output are described. FIG. 6 illustrates one cycle of a sinusoidal signal 205, together with a correlation network 214 suitable to detect such a signal in accordance with the principles of the present invention. For the purposes of illustration the various waveforms and the correlation network have been arranged to coincide in time. That is, signal 205 is illustrated as one cycle of a sinusoidal wave commencing at a time $t=0$; waveform 208 illustrates the noise present during the period of time which it takes signal 205 to cycle; and waveform 211 illustrates the summation of waveforms 205 and 208. Waveforms 206, 209 and 212 illustrate the substantially square wave signals provided by passing waveforms 205, 208 and 211 respectively through a limiter. These limited waveforms represent the condition in which the signals would be read into the storage matrix of the present invention. The pulses illustrated by pulse groups 207, 210 and 213 illustrate the pulses that would appear on the vertical drive wires when signals 206, 209 and 212 respectively are read out of the storage matrix. The processing of a noise-free signal such as signal 205 is accomplished in the manner previously described. That is, after limiting, the substantially square wave signal energized all magnetic cores during its first half-cycle and none during its second half-cycle. Upon readout, pulses from the energized cores are summed by summing resistor arrangement **214*b*. Since no cores were energized during the second half-cycle, there would be no pulses during readout to be summed by summing resistor arrangement 214***a*. The total output of the correlation network therefore would be the sum total of the pulses delivered from the magnetic cores energized during the positive half-cycle of signal 205. In the present illustration, this would comprise sixteen pulses. In the event that a noise signal, such as is illustrated by waveform 208, were processed, a substantially square wave signal as represented by waveform 209 would be written into the storage matrix. The magnetic cores of the storage matrix would be energized during the positive pulses of signal 209. Upon readout, the pulses illustrated by pulse group 210 would appear on respective matrix vertical drive wires. In this instance, summing resistor arrangement 214*b* would sum nine pulses, the summing resistor arrangement 214*a* would sum and invert eight pulses. The outputs of summing resistor arrangement 214*b* and inverter 8 would then be summed by resistors 10 to provide an output of one pulse. Statistically, over a period of time, the noise signal would be positive substantially 50% of the time and negative substantially 50% of the time. Therefore, any substantial sampling of a noise signal would produce a zero output from the correlation network.

The usual case, especially in radar systems, is that the signal to be correlated or detected is buried in noise. Despite this fact, the time amplitude characteristics of the signal are manifest in the output of the correlation network of the invention. This is so because, when added to the noise, the signal causes the noise to be either more positive or more negative than it would normally be, depending on the instant polarity of such a signal. Waveform 211 illustrates this as signal 205 is added to noise signal 208. During the first half-cycle of signal 205, it causes the noise waveform 211 to be more positive than normal, and during the second half-cycle, causes it to be more negative than normal. This combined waveform is illustrated by waveform 211. When waveform 211 is limited, the effects of signal waveform 205 are manifested by the predominantly negative portion during the second half of the cycle. When signal 212 is read into the storage matrix, substantially all of the magnetic cores during the first half of the cycle are energized. Few cores are energized during the second half of the cycle. Upon readout, the energized cores produce pulses on their respective vertical drive wires as illustrated by pulse group 213. Summing resistor arrangement 214*b* in this instance sums thirteen pulses, and summing resistor arrangement 214*a* sums and inverts four pulses. The output of correlation network 214 therefore is nine pulses. In the event that signal 205 had been of a greater amplitude than illustrated in FIG. 6, it would have had even greater influence on the combined signal 211 and consequently would have produced a larger correlation network output. It is of course possible for a very large signal to completely dominate the noise, in which case the limited combined signal would be substantially as illustrated by waveform 206, and a sixteen-pulse output would be obtained from the correlation network. On the other hand, if the amplitude of signal 205 were very small, it would contribute little to the make-up of the combined waveform 211. The resulting limited waveform and correlation network output would therefore be substantially as represented by waveform 209 and pulse group 210 respectively.

It has thus been demonstrated that the amplitude of the signal being processed affects the relative output of the correlation network when in the presence of noise or other large signal, and notwithstanding the fact that only time polarity information is stored in the storage matrix.

It is another feature of this invention to provide resistors in the summing networks whose values reflect the instantaneous value of the signals being processed. Referring to waveform 205, it will be noted that during the time intervals represented by portions *a*, *b* and *c*, the instantaneous value of the signal is low; and therefore, it is weakest with respect to the noise signal with which it is combined. Conversely, during the time represented by the other portions, the instantaneous value of signal 205 is maximum with respect to the noise signal. Therefore, it is desirable to discriminate against the combined signal 211 during the periods represented by portions *a*, *b* and *c* of signal 205. This is accomplished by properly weighting the summing resistors of the correlation networks. In the example illustrated by FIG. 6, the signal to be detected is a sine wave. Consequently, resistors 231 and 246 of resistor summing arrangement 214*b* would be a maximum value, and resistors 238 and 239 would be a minimum value; and the intervening resistors would have values designed to coincide with the instantaneous value of the sine wave. In the same manner with respect to summing resistor arrangement 214*a*, resistors 215 and 230 would have a maximum value, and resistors 222 and 223 would have a minimum value, with the intervening resistors being tailored to reflect the instantaneous value of the sine wave.

The technique of resistor weighting may also be employed to reduce undesirable effects of side responses to any signal having a frequency close to a desired frequency. If the signal correlation network is designed to detect a given fixed frequency signal, it will also have some response at other frequencies. Now such side responses can be reduced considerably by weighting the resistor values of the correlation network in accordance with a Gaussian or Taylor weighting function, or their equivalent. This weighting is analogous to the tapering of the illumination of an antenna aperture to reduce side lobes.

Threshold detectors such as threshold detectors 160–162 of FIG. 4 at each summing output can generate an alarm output indicating the presence of a correlated signal. If it is not desired to have specific information as to which correlator output contained the signal, all the alarm outputs can be combined into a single output indicating only that a signal has appeared.

By sequentially triggering each of the horizontal wires, the range gates are fed into the correlation analyzers, one at a time. The range to a target is identified by the time during the readout cycle that the alarm occurs.

There have thus been disclosed concepts and apparatus capable of accomplishing the various stated objects of the invention. Other uses will be suggested to those skilled in the art, and numerous modifications may be made thereby of the apparatus described herein without departing from the disclosed inventive concepts.

What is claimed is:

1. Apparatus for signal identification comprising storage means for storing only the time polarity characteristics of a portion of a signal such that subsequent retrieval can occur at any desired time, means responsive to the polarity characteristics as a function of time of a particular signal, and means for delivering thereto in parallel fashion time polarity characteristics stored in said storage means.

2. Apparatus for signal identification comprising storage means for storing only the time polarity characteristics of a portion of a signal, means responsive to the phase and instantaneous amplitude characteristics as a function of time of a particular signal, and means for delivering thereto in parallel fashion time polarity characteristics stored in said storage means.

3. Apparatus for signal identification comprising storage means for storing only the time polarity characteristics of a portion of a signal such that subsequent retrieval can occur at any desired time, means responsive to the polarity and instantaneous amplitude characteristics as a function of time of a particular signal, and means for delivering thereto in parallel fashion the time polarity characteristics stored in said storage means.

4. Signal identification apparatus comprising delay means for retaining only polarity time characteristics of a signal any desired period of time, sampling means for simultaneously sampling a signal retained therein at a plurality of points in its time history, a plurality of signal correlation networks, each being responsive to characteristics of a particular signal, means for delivering in parallel fashion the output of said sampling means thereto, and means for indicating correlation between any of said correlation networks and said delivered samples.

5. Signal identification apparatus comprising storage means for retaining only polarity time characteristics of a signal a period of time, sampling means for simultaneously sampling a signal retained therein at a plurality of points in its time history, a plurality of signal correlation networks, each being responsive to characteristics of a particular signal, means for delivering in parallel fashion the output of said sampling means thereto, and means for indicating correlation between any of said correlation networks and said delivered samples.

6. Signal identification apparatus comprising delay means for retaining only polarity time characteristics of a signal a period of time, sampling means for simultaneously sampling a signal retained therein at a plurality of points in its time history, a correlation network responsive to characteristics of a particular signal, means for delivering in parallel fashion the output of said sampling means thereto, and means for indicating correlation between said correlation network and said delivered samples.

7. Signal identification apparatus comprising storage means for retaining only polarity time characteristics of a signal a period of time, sampling means for simultaneously sampling a signal retained therein at a plurality of points in its time history, a correlation network responsive to characteristics of a particular signal, means for delivering in parallel fashion the output of said sampling means thereto, and means for indicating correlation between said correlation network and said delivered samples.

8. An orthogonal storage matrix comprising a multiplicity of bi-stable logic elements arranged in rows and columns, an electrical conductor connected to the bi-stable logic elements of each row of bi-stable logic elements, an electrical conductor connected to the bi-stable logic elements of each column of bi-stable logic elements, means for applying signals to the conductors connecting said rows of bi-stable logic elements, one signal being applied to one row of bi-stable logic elements, means for first sequentially applying write pulses to the conductors connecting said columns of bi-stable logic elements whereby said signals are serially read into the martix, and means for subsequently sequentially applying readout pulses to the conductors connecting said rows of bi-stable logic elements thereby providing parallel readout of said serially read in signals.

9. An orthogonal storage matrix comprising a multiplicity of multi-stable logic elements arranged in rows and columns, an electrical conductor connected to the multi-stable logic elements of each row of multi-stable logic elements, an electrical conductor connected to the multi-stable logic elements of each column of multi-stable logic elements, means for applying signals to the conductors connecting said rows of multi-stable logic elements, one signal being applied to one row of bi-stable logic elements, means for first sequentially applying write pulses to the conductors connecting said columns of multi-stable logic elements whereby said signals are serially read into the matrix and means for subsequently sequentially applying readout pulses to the conductors connecting said rows of multi-stable logic elements, thereby providing parallel readout of said serially readin signals.

10. An orthogonal storage matrix comprising a multiplicity of magnetic cores arranged in rows and columns, said magnetic cores being initially in a 0 state, an electrical conductor connected to the magnetic cores of each row of magnetic cores, an electrical conductor connected to the magnetic cores of each column of magnetic cores, means for applying signals to conductors connecting said rows of magnetic cores, one signal being applied to one row of bi-stable logic elements, means for first sequentially applying write pulses to conductors connecting said columns of magnetic cores, said write pulses having a magnitude sufficient when coincident with a positive signal to place a magnetic core in a 1 state, whereby said signals are serially read into the matrix and means for subsequently sequentially applying readout pulses to conductors connecting said rows of magnetic cores, thereby providing parallel readout of said serially readin signals.

11. An orthogonal storage matrix comprising a multiplicity of magnetic cores arranged in rows and columns, said magnetic cores being initially in a first state, an electrical conductor connected to the magnetic corecs of each row of magnetic cores, an electrical conductor conneted to the magnetic cores of each column of magnetic cores, means for applying signals to conductors connecting raid rows of magnetic cores, one signal being applied to one row of bi-stable elements, means for first sequentially applying write pulses to conductors connecting said columns of magnetic cores, said write pulses having a magnitude sufficient when coincident with a positive signal to place a magnetic core in a second state, whereby said signals are serially read into the matrix and means for subsequently sequentially applying readout pulses to conductors connecting said rows of magnetic cores, thereby providing parallel readout of said serially readin signals.

12. Apparatus for signal identification comprising a memory for storing only time polarity characteristics of portions of signals, and an arrangement of summing resistors grouped to sum substantially all of a multiplicity of simultaneously presented samples representing the phase characteristics as a function of time of a particular signal only and means for reading out said memory into said summing arrangement.

13. Apparatus for signal identification, comprising a memory for storing only time polarity characteristics of portions of signals, and an arrangement of summing resistors grouped to sum substantially all of a multiplicity of simultaneously presented samples representing the polarity characteristics as a function of time of a particular signal only and means for reading out said memory into said summing arrangement.

14. A signal correlation network comprising a first series of summing resistors connected to a first common output wire and grouped to sum substantially all of a multiplicity of simultaneously presented samples representing only the polarity characteristics as a function of time of the positive half cycles of a portion of a particular signal, a second series of summing resistors connected to a second common output wire and grouped to sum substantially all of a multiplicity of simultaneously presented samples representing only the polarity characteristics as a function of time of the negative half cycles of said portion of said particular signal, polarity inverting means for inverting the polarity of the output of said second output wire, and means for combining the output of said polarity inverting means and the output of said first output wire.

15. Signal identification apparatus comprising an orthogonal storage matrix, said orthogonal storage matrix including a multiplicity of bi-stable logic elements arranged in rows and columns, an electrical conductor connected to the bi-stable logic elements of each row of bi-stable logic elements, an electrical conductor connected to the bi-stable logic elements of each column of bi-stable logic elements, means for applying signals to conductors connecting said rows of bi-stable logic elements, means for first sequentially applying write pulses to the conductors connecting said columns of bi-stable logic elements, and means for subsequently sequentially applying read-out pulses to conductors connecting said rows of bi-stable logic elements whereby pulses representing time polarity samples of signals applied to said last-named conductors are delivered to the conductors connecting said columns of bi-stable logic elements, a signal correlation network including an arrangement of summing resistors grouped to sum substantially all of a multiplicity of simultaneously presented time polarity samples of a particular signal only, said summing resistors being connected to said conductors connecting said columns of bi-stable logic elements.

16. Signal identification apparatus comprising an orthogonal storage matrix, said orthogonal storage matrix including a multiplicity of magnetic cores arranged in rows and columns, said magnetic cores being initially in a 0 state, an electrical conductor connected to the magnetic cores of each row of magnetic cores, an electrical conductor connected to the magnetic cores of each column of magnetic cores, means for applying signals to conductors connecting said rows of magnetic cores, means for first sequentially applying write pulses to conductors connecting said columns of magnetic cores, said write pulses having a magnitude sufficient when coincident with a positive signal to place a magnetic core in a 1 state and means for subsequently sequentially applying read-out pulses to conductors connecting said rows of magnetic cores whereby pulses representing time polarity samples of signals applied to said last-mentioned conductors are delivered to the conductors connecting said columns of magnetic cores, a signal correlation network including a first series of summing resistors connected to a first common output wire and grouped to sum substantially all of a multiplicity of simultaneously presented samples representing the phase characteristics as a function of time of the positive half cycles of a portion of a particular signal, a second series of summing resistors connected to a second common output wire and grouped to sum substantially all of a multiplicity of simultaneously presented samples representing the phase characteristics as a function of time of the negative half cycles of said portion of said particular signal, said first and second series of summing resistors being connected to said conductors connecting said columns of magnetic cores, polarity inverting means for inverting the polarity of the output of said second output wire and means for combining the output of said polarity inverting means and the output of said first output wire.

17. Signal identification apparatus comprising an orthogonal storage matrix, said orthogonal storage matrix including a multiplicity of magnetic cores arranged in rows and columns, said magnetic cores being initially in a first state, an electrical conductor connected to the magnetic cores of each row of magnetic cores, an electrical conductor connected to the magnetic cores of each column of magnetic cores, means for applying signals to conductors connecting said rows of magnetic cores, means for first sequentially applying write pulses to conductors connecting said columns of magnetic cores, said write pulses having a magnitude sufficient when coincident with a positive signal to place a magnetic core in a second state and means for subsequently sequentially applying read-out pulses to conductors connecting said rows of magnetic cores whereby pulses representing time polarity samples of signals applied to said last-mentioned conductors are delivered to the conductors connecting said columns of magnetic cores, a signal correlation network including a first series of summing resistors connected to a first common output wire and grouped to sum substantially all of a multiplicity of simultaneously presented samples representing the phase characteristics as a function of time of the positive half cycles of a portion of a particular signal, a second series of summing resistors connected to a second common output wire and grouped to sum substantially all of a multiplicity of simultaneously presented samples representing the phase characteristics as a function of time of the negative half cycles of said portion of said particular signal, said first and second series of summing resistors being connected to said conductors connecting said columns of magnetic cores, polarity inverting means for inverting the polarity of the output of said second output wire and means for combining the output of said polarity inverting means and the output of said first output wire.

18. Signal identification apparatus comprising an orthogonal storage matrix, said orthogonal storage matrix including a multiplicity of magnetic cores arranged in rows and columns, said magnetic cores being initially in a 0 state, an electrical conductor connected to the magnetic cores of each row of magnetic cores, an electrical conductor connected to the magnetic cores of each column of magnetic cores, means for applying signals to conductors connecting said rows of magnetic cores, means for first sequentially applying write pulses to conductors connecting said columns of magnetic cores, said write pulses having a magnitude sufficient when coincident with a positive signal to place a magnetic core in a 1 state and means for subsequently sequentially applying read-out pulses to conductors connecting said rows of magnetic cores whereby pulses representing time polarity samples of signals applied to said last-mentioned conductors are delivered to the conductors connecting said columns of magnetic cores, a signal correlation network including a first series of summing resistors connected to a first column output wire and grouped to sum substantially all of a multiplicity of simultaneously presented samples representing the phase and instantaneous amplitude characteristics as a function of time of the positive half cycles of a portion of a particular signal, a second series of summing resistors connected to a second common output wire and grouped to sum substantially all of a multiplicity of simultaneously presented samples representing the phase and instantaneous amplitude characteristics as a function of time of the negative half cycles of said portion of said particular signal, said first and second series of summing resistors being connected to said conductors connecting said columns of magnetic cores, polarity inverting means for inverting the polarity of the output of said second output wire and means for combining the output of said polarity inverting means and the output of said first output wire.

19. A signal identification system comprising storage means having a multiplicity of signal storage positions and adapted to store only polarity samples of a signal in said positions in correspondence with the time relationship of said samples in said signal, and a signal detecting network including a plurality of sample summing circuits each connected to certain groups of sample storage positions, said sample summing circuits having a common output and being arranged to sum substantially all of the samples of a particular signal.

20. A signal identification system comprising storage means for simultaneously storing a multiplicity of signals, said storage means having a multiplicity of signal sample storage positions and being adapted to store only polarity samples of said signals in said positions in correspondence with the time relationships of said samples in said signals, and multiple signal detecting networks, each said network including a plurality of sample summing circuits each connected to certain groups of sample storage positions, said sample summing circuits having a common output and being arranged to sum substantially all of the samples of a particular signal.

21. A signal identification system as defined in claim 20 wherein each said signal detecting network contains additional sample summing circuits adapted to sum substantially all of the samples of the particular signals associated therewith which have been stored in said storage means in an out-of-phase relationship.

22. A signal identification system comprising storage means for simultaneously storing a multiplicity of signals, said storage means having a multiplicity of signal sample storage positions and being adapted to store only polarity samples of said signals in said positions in correspondence with the time relationships of said samples in said signals, and multiple signal detecting networks, each said network including first and second sample sum ming circuits each connected to certain groups of sample storage positions, said first sample summing circuit being arranged to sum substantially all of the positive samples of a particular signal, said second sample summing circuit being arranged to sum substantially all of the negative samples of a particular signal and having means for reversing the polarity of said summed samples, said first and second sample summing circuits having a common output.

23. Apparatus for signal identification comprising an orthogonal magnetic core storage matrix adapted to store simultaneously the time polarity characteristics only of a multiplicity of signals, a signal correlation network, read-out means effective to generate pulses responsive to the stored time polarity characteristics of each signal, means for delivering said pulses to said signal correlating network, said correlating network including a plurality of summing networks, each said summing network being adapted to sum substantially all of the pulses of a particular signal, and means for indicating each occasion that substantially all pulses representing a particular signal are summed.

24. Apparatus for signal identification comprising an orthogonal storage matrix having a multiplicity of magnetic cores arranged in rows and columns, an electrical conductor connecting the magnetic cores of each row of mangetic cores, and an electrical conductor connecting the magnetic cores of each column of magnetic cores, a signal input means associated with each electrical conductor connecting each row of magnetic cores, each said signal input means including means for limiting the amplitude of the input signal and a signal write driver, means for sequentially pulsing the electrical conductors connecting each column of magnetic cores, said means comprising means for generating periodic write pulses, means for delivering said write pulses, sequentially, to successive conductors connecting columns of magnetic cores and a write driver associated with each said conductor, means for subsequently applying read-out pulses to said conductors connecting said rows of magnetic cores, said means comprising means for generating periodic read-out pulses, means for delivering said read-out pulses sequentially to successive conductors connecting rows of magnetic cores, and a read-out driver associated with each said conductor, a signal correlation network including a plurality of pulse-summing circuits, each pulse-summing circuit comprising a first series of summing resistors connected to a first common output wire and grouped to sum substantially all of a multiplicity of simultaneously presented pulses representing time polarity samples of the positive half cycles of a portion of a particular signal, a second series of summing resistors connected to a second common output wire and grouped to sum substantially all of multiplicity of simultaneously presented pulses representing time polarity samples of the negative half cycles of said portion of said particular signal, said first and second series of summing resistors being connected to said conductors connecting said columns of magnetic cores, polarity inverting means for inverting the polarity of the output of said second output wire and means for combining the output of said polarity inverting means and the output of said first output wire, and means for indicating each coincidence of a stored signal with a summing circuit.

References Cited

UNITED STATES PATENTS

| | | | |
|---|---|---|---|
| 2,946,044 | 7/1960 | Bolgiano et al. | 340—174 |
| 3,233,220 | 2/1966 | Wilby | 340—146.3 |
| 3,302,162 | 1/1967 | Rowlands. | |
| 3,303,335 | 2/1967 | Pryor | 235—181 |
| 3,317,905 | 5/1967 | Hunt | 340—347 |
| 2,811,713 | 10/1957 | Spencer | 340—166 XR |
| 2,957,163 | 10/1960 | Kodis. | |
| 3,139,614 | 6/1964 | Gilson | 340—347 |
| 3,215,994 | 11/1965 | Dowling | 340—174 |
| 3,221,159 | 11/1965 | Cook et al. | 235—181 |
| 3,271,765 | 9/1966 | Pulford. | |
| 3,412,334 | 11/1968 | Whitaker | 235—181 XR |

DONALD J. YUSKO, Primary Examiner

U.S. Cl. X.R.

235—181